US012598340B2

(12) United States Patent
Pawlikowski et al.

(10) Patent No.: US 12,598,340 B2
(45) Date of Patent: Apr. 7, 2026

(54) SYSTEMS AND METHODS FOR DETECTING AND ADDRESSING APPLICATIONS UTILIZING ADAPTIVE BITRATES WHEN PROVIDING VIDEO TRAFFIC

(71) Applicant: Verizon Patent and Licensing Inc., Basking Ridge, NJ (US)

(72) Inventors: Krzysztof Pawlikowski, Farmington, CT (US); Khurram Abbas, Novi, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 18/436,676

(22) Filed: Feb. 8, 2024

(65) Prior Publication Data

US 2025/0260852 A1     Aug. 14, 2025

(51) Int. Cl.
G06F 15/16     (2006.01)
H04N 21/24     (2011.01)
H04N 21/2662   (2011.01)

(52) U.S. Cl.
CPC ..... *H04N 21/2402* (2013.01); *H04N 21/2662* (2013.01)

(58) Field of Classification Search
CPC ............ H04N 21/2402; H04N 21/2662; H04L 43/00; H04L 43/0876
See application file for complete search history.

(56) References Cited

U.S. PATENT DOCUMENTS

2020/0045519 A1* 2/2020 Raleigh ................... H04W 4/08
2021/0160558 A1* 5/2021 Sorkin .............. H04N 21/6131
2022/0264360 A1* 8/2022 Chen ..................... H04L 65/765

* cited by examiner

*Primary Examiner* — Yves Dalencourt

(57) ABSTRACT

In some implementations, a network device may receive, from a server, video traffic associated with an application, wherein the application is associated with a video content provider. The network device may detect whether the application utilizes an adaptive bitrate to provide the video traffic, based on a bitrate associated with the video traffic in relation to a maximum bitrate. The network device may assist a remediation based on whether the application utilizes the adaptive bitrate.

20 Claims, 10 Drawing Sheets

400

600

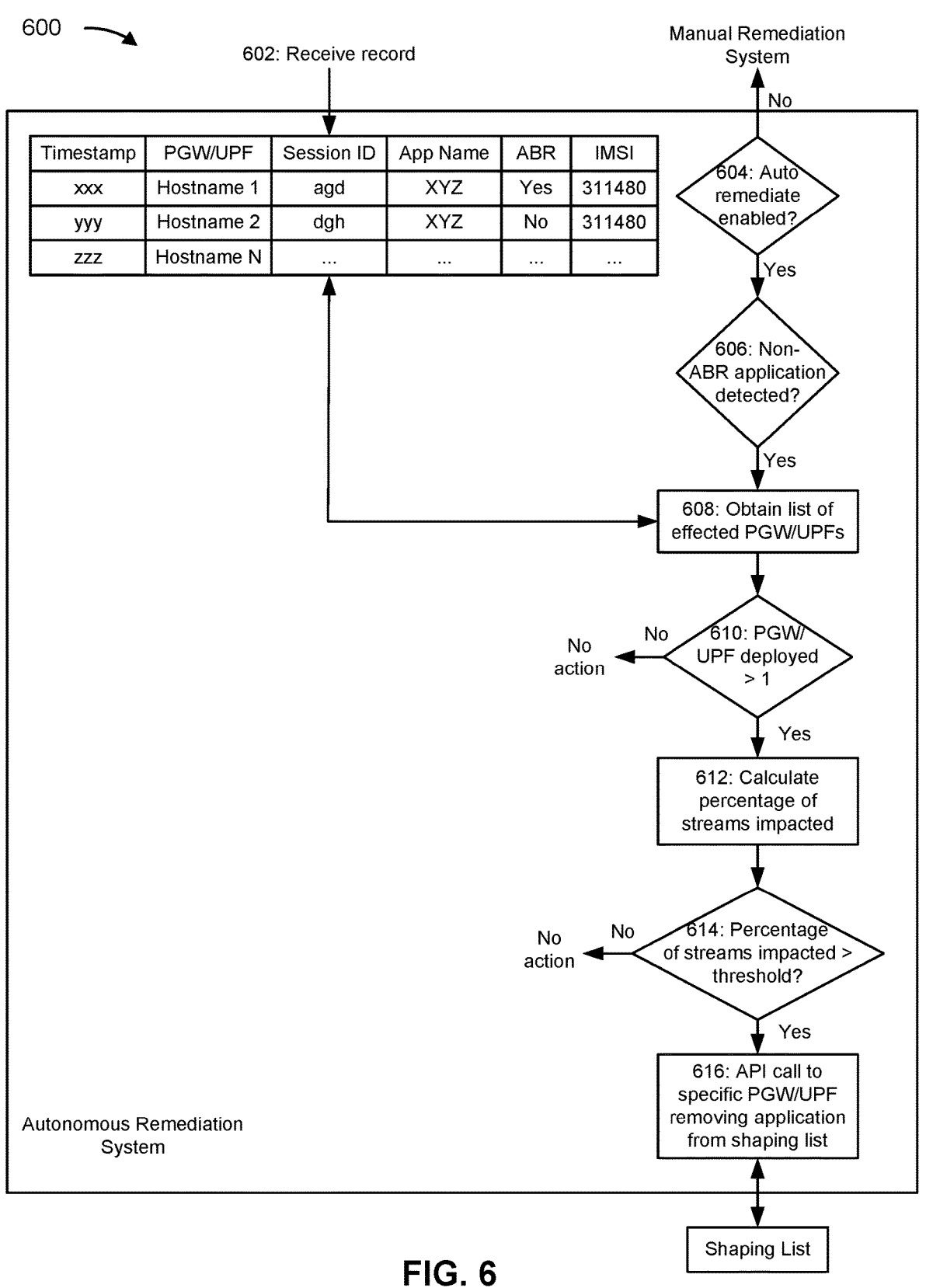

602: Receive record

| Timestamp | PGW/UPF | Session ID | App Name | ABR | IMSI |
|-----------|---------|------------|----------|-----|------|
| xxx | Hostname 1 | agd | XYZ | Yes | 311480 |
| yyy | Hostname 2 | dgh | XYZ | No | 311480 |
| zzz | Hostname N | ... | ... | ... | ... |

Manual Remediation System

No

604: Auto remediate enabled?

Yes

606: Non-ABR application detected?

Yes

608: Obtain list of effected PGW/UPFs

No action ← No — 610: PGW/UPF deployed > 1

Yes

612: Calculate percentage of streams impacted

No action ← No — 614: Percentage of streams impacted > threshold?

Yes

616: API call to specific PGW/UPF removing application from shaping list

Autonomous Remediation System

Shaping List

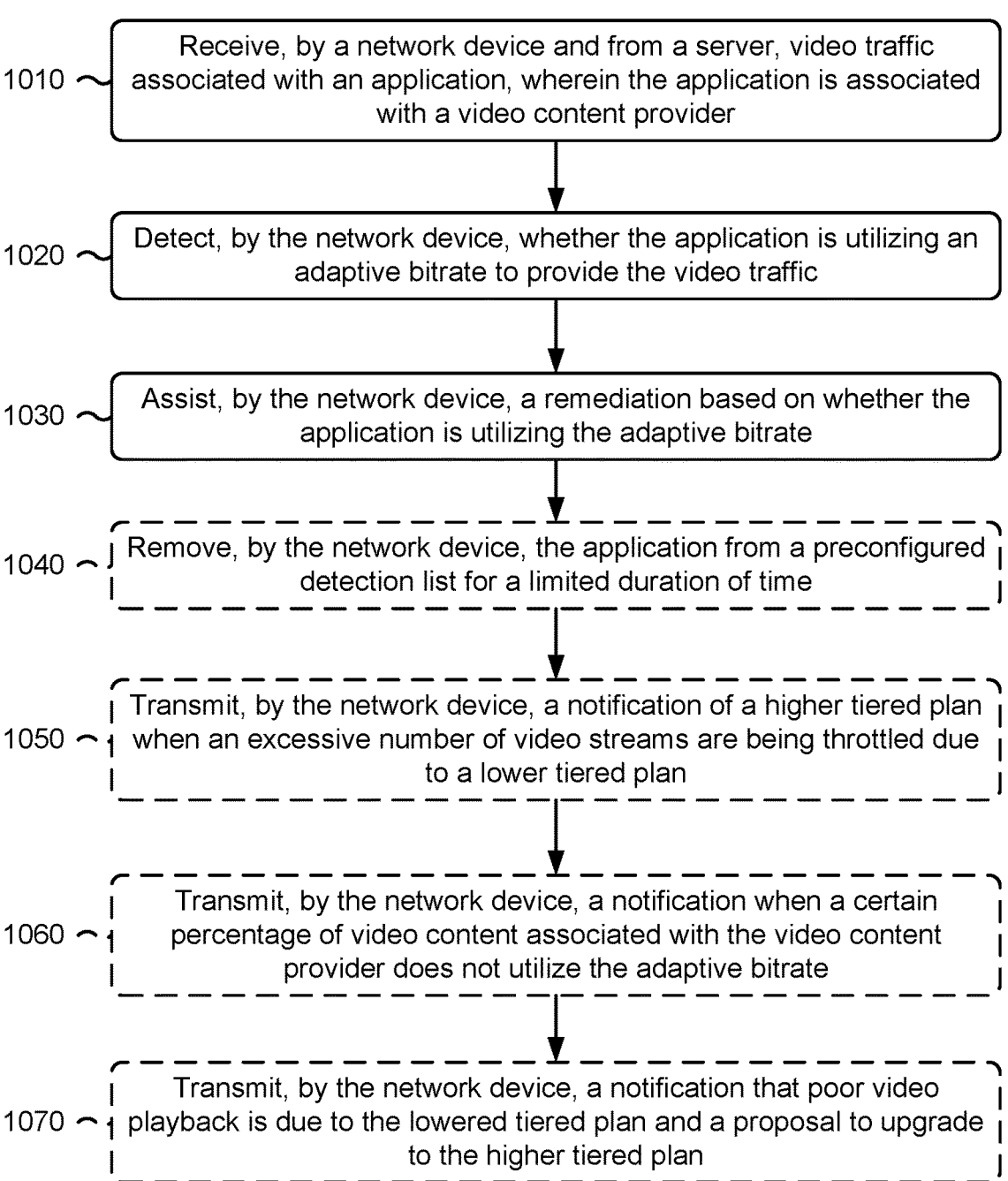

1010 → Receive, by a network device and from a server, video traffic associated with an application, wherein the application is associated with a video content provider 1020 → Detect, by the network device, whether the application is utilizing an adaptive bitrate to provide the video traffic 1030 → Assist, by the network device, a remediation based on whether the application is utilizing the adaptive bitrate 1040 → Remove, by the network device, the application from a preconfigured detection list for a limited duration of time 1050 → Transmit, by the network device, a notification of a higher tiered plan when an excessive number of video streams are being throttled due to a lower tiered plan 1060 → Transmit, by the network device, a notification when a certain percentage of video content associated with the video content provider does not utilize the adaptive bitrate 1070 → Transmit, by the network device, a notification that poor video playback is due to the lowered tiered plan and a proposal to upgrade to the higher tiered plan

FIG. 10

SYSTEMS AND METHODS FOR DETECTING AND ADDRESSING APPLICATIONS UTILIZING ADAPTIVE BITRATES WHEN PROVIDING VIDEO TRAFFIC

BACKGROUND

Wireless communication systems are widely deployed to provide various telecommunication services such as telephony, video, data, messaging, and broadcasts. A wireless network may include one or more network nodes that support communication for wireless communication devices.

BRIEF DESCRIPTION OF THE DRAWINGS

FIG. 6 is a diagram of an example associated with assisting a remediation depending on whether an application utilizes adaptive bitrates.

FIG. 10 is a flowchart of an example process associated with detecting whether an application utilizes adaptive bitrates when providing video traffic.

DETAILED DESCRIPTION OF EXAMPLE EMBODIMENTS

Figure 1:
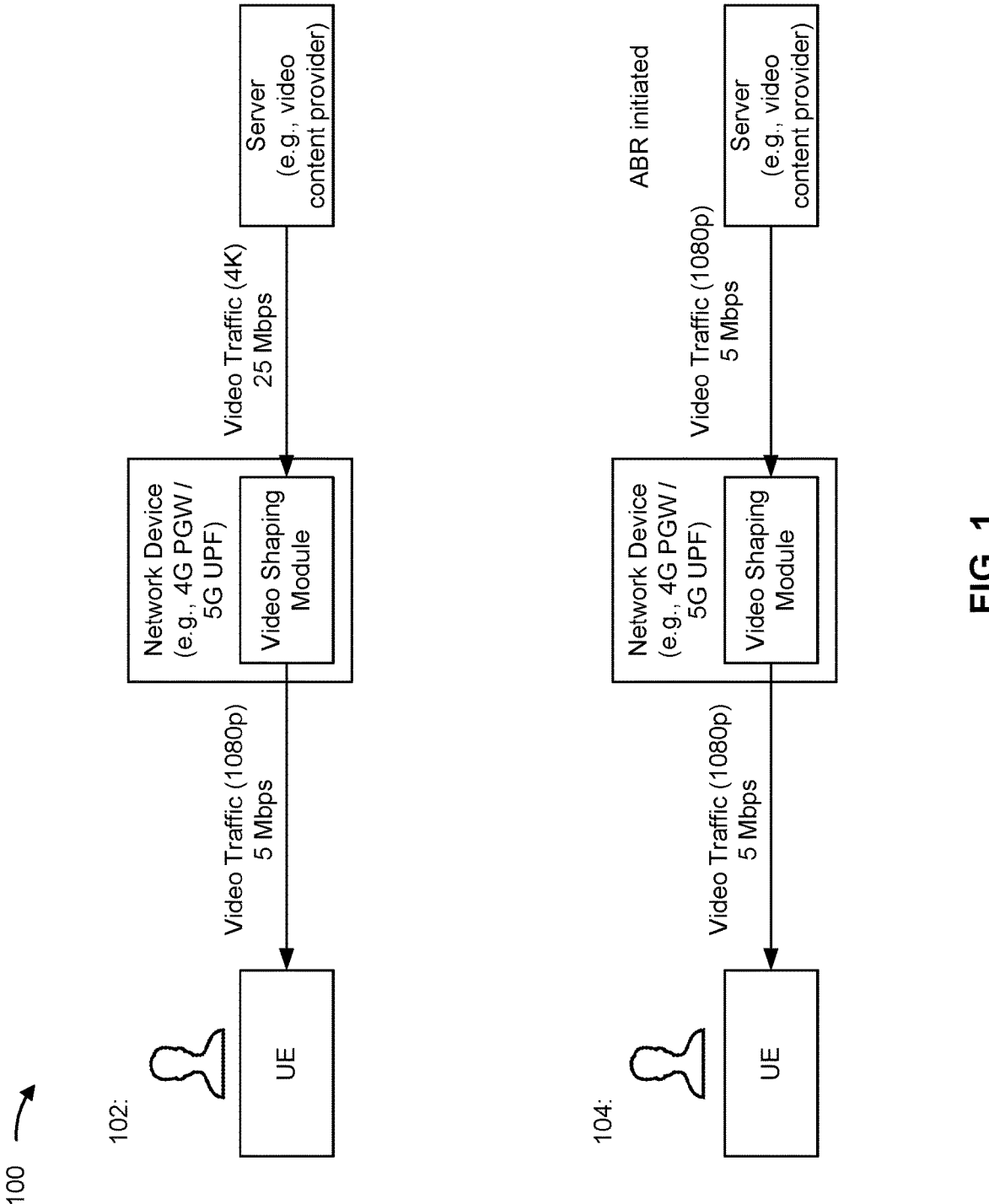
FIG. 1 is a diagram of an example associated with adaptive bitrate (ABR) initiated at a video content provider.

The following detailed description of example implementations refers to the accompanying drawings. The same reference numbers in different drawings may identify the same or similar elements.

A network operator may provide service tiers (or streaming tiers) to users. A service tier may correspond to a guaranteed bit rate regardless of network conditions. The network operator may use detection software to determine whether a particular data stream is a video stream using ABR, heuristics, etc. and shape that data stream to satisfy a particular service tier. When a video content provider also analyzes a bottleneck imposed by the network operator based on the service tier, the video content provider may lower a bitrate to avoid interruption (e.g., when a user entitled to only a 1080p video quality requests 4K content, the network operator may shape traffic accordingly, and then the video content provider may detect the shaping and lower the bitrate accordingly. However, some video content providers (e.g., applications) may not have ABR capabilities, such that the network operator may reshape traffic, but the video content provider may not recognize the shaping and still send data streams at higher bitrates (e.g., 25 Mbps), thereby causing interruptions and causing customers to complain to the network operator.

The video content provider may provide video traffic to a user equipment (UE) at various qualities. The video content provider may change a video quality based on network conditions using ABR. ABR (or similar technologies) may involve changing a bitrate in real-time based on the network conditions. ABR may be useful to reduce a number of video stalls (e.g., pauses in videos) when consuming the video traffic at particular levels of video quality. When the UE consumes video traffic that does not utilize ABR, a poor user experience may result. For example, when the UE is entitled to 480p video quality (e.g., a lower video quality) and is consuming video traffic from a video content provider that serves video traffic exclusively in 5K (no ABR, and where 5K is a higher video quality), the UE may experience slow load times, video stalls, and/or excessive buffering. The UE may experience such poor conditions even when the UE is associated with a high tier of video stream quality from the network operator. However, in this case, the poor experience is not because of the network operator but rather due to the video content provider's inability to provide video traffic using ABR.

In some implementations, a network node may receive, from a server, video traffic associated with an application. The application may be associated with a video content provider. The network node may detect whether the application utilizes an adaptive bitrate to provide the video traffic, based on a bitrate associated with the video traffic in relation to a maximum bitrate. When the network node applies shaping and detects a reduction in bitrate from the application, the network node may determine that the application utilizes the adaptive bitrate. When the network node applies shaping and does not detect the reduction in bitrate from the application, the network node may determine that the application does not utilize the adaptive bitrate. The network node may assist a remediation when the application does not utilize the adaptive bitrate.

In some implementations, the network node, which may be associated with a network operator, may detect non-ABR video traffic in tiered service offerings. The network node may identify video content providers that do not utilize ABR (or similar technologies) using application video detection and traffic shaping algorithms used to enforce video streaming quality tiers in a wireless network. The network node may be able to detect the video content providers that are not using ABR, which may then allow the network operator to triage issues in which users are complaining of excessive video stalls and buffering and take remedial actions to remedy the complaints. Such remedial actions may involve upgrading a user to a higher tiered plan and/or providing an explanation of the issue to the user. By detecting when non-ABR video traffic is being provided and then taking remedial actions, slow load times, video stalls, and/or excessive buffering at the UE may be reduced, which may reduce battery wastage at the UE and improve an overall UE performance.

FIG. 1 is a diagram of an example 100 associated with ABR initiated at a video content provider. As shown in FIG. 1, example 100 includes a UE (e.g., UE 802), a network device (e.g., network device 804), and a server (e.g., server 806).

A user, such as an Internet service provider (ISP) customer or subscriber, may be sold a service offering, which may include tiered access to video traffic based on an overall bandwidth consumption, speed, reliability, quality of service delivered, and/or other factors. The video traffic may be delivered over a wired network or a wireless network. Since video traffic may consume a significant portion of overall network traffic, an ISP may offer services tiered by video streaming quality, which may be segmented into various nomenclatures, such as 480p, 1080p, 4K, 5K, and so on. When the user signs up for service, the user may be provided with a certain tier of video streaming quality which they should expect to receive under typical conditions.

A network operator may employ application video detection software to enforce a video streaming quality expectation in the wireless network, such as a fourth generation (4G) network or a fifth generation (5G) network. The application video detection software may serve to identify well-known video content providers. The application video detection software may be coupled with a traffic shaping algorithm that limits video streams to a given bandwidth, thereby enforcing a maximum video streaming quantity that the user is entitled to receive. In other words, the traffic shaping algorithm may serve to throttle or shape video traffic in the wireless network. The combination of application video detection and traffic shaping may reside in a software module contained in the network device, such as a 4G packet gateway (PGW) or a 5G user plane function (UPF) in a wireless network.

The video content provider, which may be associated with a server, may provide video content to a UE associated with the user at various qualities (e.g., 480p, 1080p, 4K, or 5K). The video content provider may have an ability to change qualities given network conditions. The video content provider may change video quality based on network conditions using an ABR. ABR (or similar technologies) may be used to detect a UE bandwidth and/or a UE capability, and then adjust a quality of a stream in real-time. ABR may involve changing a bitrate in real-time based on network conditions. ABR may be useful to reduce a number of video stalls (e.g., pauses in videos) that the user experiences when consuming the video content. The video content provider may rather serve the UE a lower quality video with little to no interruptions, rather than a high content video that cannot be played back due to lower bandwidth conditions.

As shown by reference number 102, the user may request, or the video content provider (or server) may attempt to serve, the UE with a highest available video quality. For example, the video content provider may send video traffic (or video content) at 4K and 25 Mbps. The network device in the wireless network, which may be associated with the network operator, may receive the video traffic, and via a video shaping module, may shape or throttle the video traffic down to 1080p and 5 Mbps. The video traffic at 1080p and 5 Mbps may be delivered to the UE. In this case, the UE may consume video traffic which is reduced in quality from 4K to 1080p due to network conditions and/or subscription status. Although the quality of the video traffic may be reduced, the playback experience may be acceptable due to their being little to no video stalls or buffering.

As shown by reference number 104, the video content provider (or server) may detect that the wireless network supports a lower resolution, which may be based on feedback from the UE. The video content provider may initiate ABR and lower a video resolution to match the network conditions. For example, the video content provider may send video traffic at 1080p and 5 Mbps, instead of sending the video traffic at 4K and 25 Mbps. The network device may receive the video traffic. The network device may not need to shape the video traffic. The video traffic at 1080p and 5 Mbps may be delivered to the UE. The UE may stream the video traffic with little to no interruptions.

FIG. 1 shows an ideal scenario in which the video content provider is able to initiate ABR for a particular video stream due to a bottleneck, throttling, and/or deteriorated network conditions. The video content provider may be capable of ABR and detect operator throttle, and then reduce quality/bitrate. The video content provider may be able to detect the bottleneck, throttling, and/or deteriorated network conditions. As described below, in some cases, a video stream may be shaped by the network operator that is not capable of ABR, which may negatively impact a customer experience.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
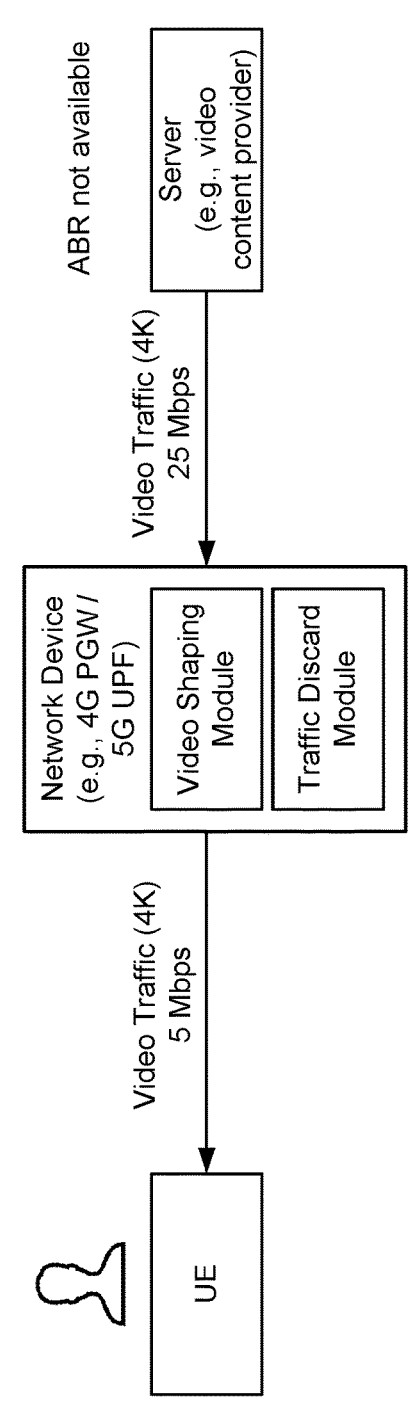
FIG. 2 is a diagram of an example associated with a lack of ABR at a video content provider.

FIG. 2 is a diagram of an example 200 associated with a lack of ABR at a video content provider. As shown in FIG. 2, example 200 includes a UE (e.g., UE 802), a network device (e.g., network device 804), and a server (e.g., server 806).

A user may sign up for a tiered offering from a network operator (e.g., a 4G/5G operator), which may include limitations on a video streaming quality. When the UE associated with the user then consumes video traffic which does not utilize ABR, the UE may experience slow load times, video stalls, and/or excessive buffering. Although many video content providers have an ability to serve video traffic using ABR, some video content providers may not change or have the ability to change their video qualities using ABR. Nevertheless, the user may place fault for their poor user experience with the network operator instead of the video content provider. When fielding such user complaints, whether the user is using a video content provider that utilizes ABR may not be readily known to the network operator.

As shown in FIG. 2, the video content provider (or server) may attempt to serve the UE with a highest available video quality. For example, the video content provider may send video traffic (or video content) at 4K and 25 Mbps. The network device, such as a 4G PGW or a 5G UPF in a wireless network, which may be associated with the network operator, may receive the video traffic, and via a traffic discard module, may discard video packets to a bandwidth to which the UE is entitled. Video traffic at 4K and 5 Mbps may be delivered to the UE. The video content provider may not support ABR, such that the video content provider may not be aware that the video packets are being discarded. The video content provider may not receive such feedback from the UE. The video content provider may continue to send video traffic at 4K and 25 Mbps (e.g., a quality of video traffic is not reduced) even though the network device has throttled and/or shaped traffic received by that particular UE. The UE may try to access video traffic at 4K video quality, but may experience video stalls and excessive buffering due to a relatively high number of packets being discarded by the network device. As a result, the user of the UE may have a poor experience viewing streaming content when ABR is not supported by the video content provider. Potentially, the user may associate this problem with the network provider rather than the content provider and contact the network provider through their various channels, increasing network provider costs and troubleshooting times.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
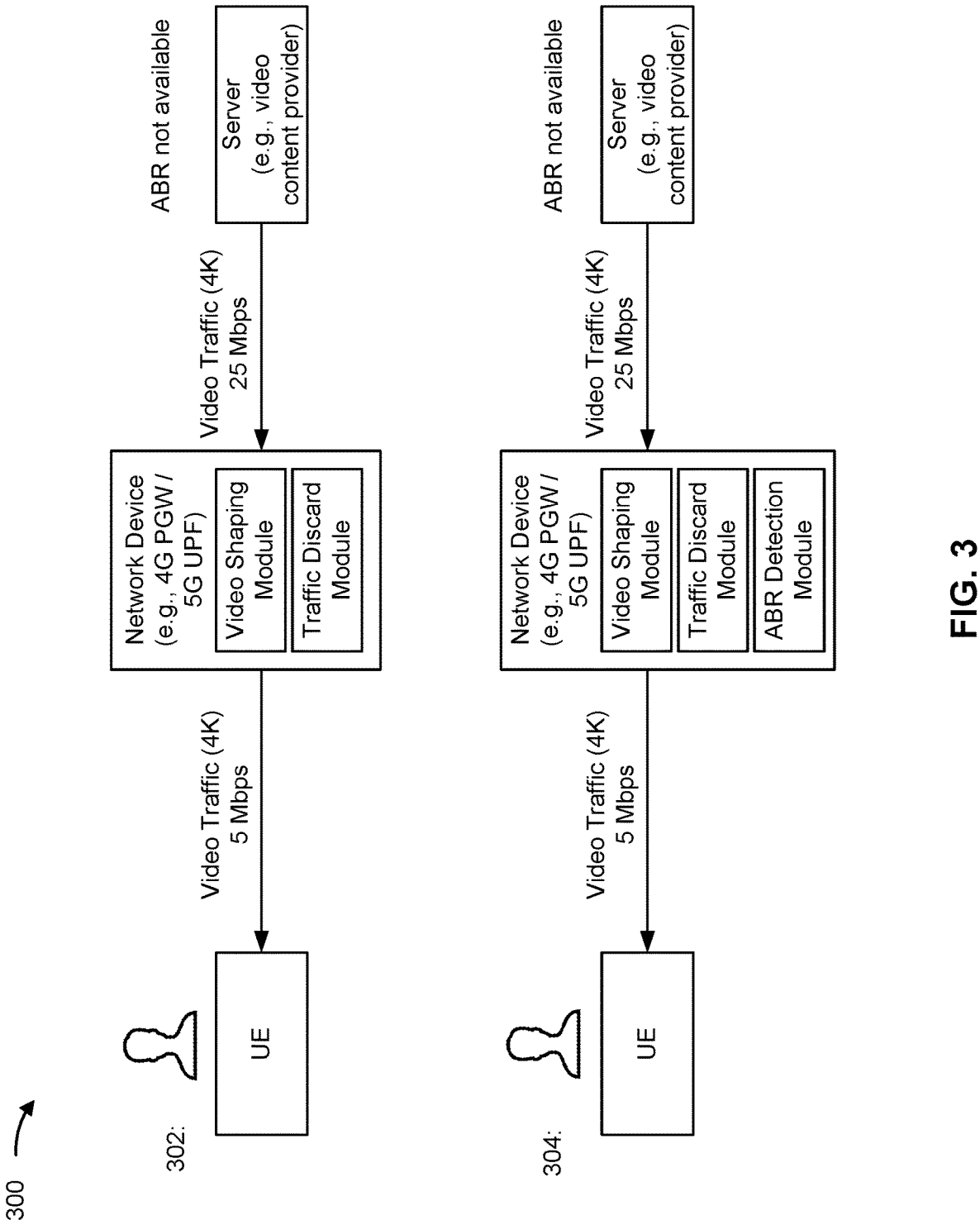
FIG. 3 is a diagram of an example associated with detecting non-ABR video traffic.

FIG. 3 is a diagram of an example 300 associated with detecting non-ABR video traffic. As shown in FIG. 3, example 300 includes a UE (e.g., UE 802), a network device (e.g., network device 804), and a server (e.g., server 806).

In some implementations, a network operator may employ a detection service to identify video content providers that are not utilizing ABR (or related technologies) using existing video detection and traffic shaping algorithms used to enforce video streaming quality tiers in wireless 4G/5G networks. When the network operator is able to detect a video content provider that is not using ABR, the network operator may triage issues related to user complaints of excessive video stalls and buffering. The network operator may take actions to remediate the complaints, such as upgrading the user to a higher tiered plan or proactively reaching out to the video content provider to explain the issue.

In some implementations, remediation may include automatic remediation. Automatic remediation may involve removing application from shaping via API calls to gateways (e.g., UPF/PGW). Automatic remediation may involve contacting users via automated email/text messaging to inform the users of a higher tiered plan when an excessive number of streams are being throttled due to a lower tiered price plan. Automatic remediation may involve contacting video content providers with automated emails when the network operator detects (on aggregate) that their video content is not ABR capable. In some implementations, remediation may include manual remediation. Manual remediation may involve informing a user, during a troubleshooting session with the user, that the user's poor video playback issue is due to the user's lower tiered service. A price plan may be proposed which would support the user's use case. Manual remediation may involve initiating an API call by a customer service representative to temporarily remove an application from the shaping list during a troubleshooting session and when the application is tagged for temporary shaping removal. Manual remediation may involve proactively working with video content providers when the network operator detects (on aggregate) that their content is not ABR capable and indicating the potential impacts to the video content provider's viewers.

In some implementations, the network operator may be able to detect non-ABR video traffic. An application video detection submodule contained in a network node of the network operator, such as a 5G UPF or a 4G PGW, may track a list of well-known video content providers (applications). When a UE associated with a user requests content from a well-known video content provider, video traffic (e.g., data flow) may start coming into the network node at a bitrate X (ingress bitrate). When the bitrate exceeds a bandwidth requirement to support a video quality to which the UE is entitled, a traffic shaping submodule of the network node may act upon the video traffic to reduce a flow of traffic to an acceptable bandwidth to support a promised video quality (e.g., 480p, 1080p, 4K, or 5K). The network node may continue to monitor the ingress bit rate for the given video traffic. When the ingress bit rate has not changed, then the network node may log the application as not supporting ABR (e.g., non-ABR). When the ingress bitrate decreases, then the network node may log the application as supporting ABR.

As shown by reference number 302, the video content provider (or server) may attempt to serve the UE with a highest available video quality. For example, the video content provider may send video traffic (or video content) at 4K and 25 Mbps. The network device, such as a 4G PGW or a 5G UPF in a wireless network, which may be associated with the network operator, may receive the video traffic and, via a traffic discard module, may discard video packets to a bandwidth to which the UE is entitled. Video traffic at 4K and 5 Mbps may be delivered to the UE. The video content provider may not support ABR, such that the video content provider may not be aware that the video packets are being discarded.

As shown by reference number 304, the network device may include an ABR detection module. The ABR detection module may detect a lack of ABR for the video content provider (application), which may be based on the monitoring of the ingress bitrate for the given video traffic. When the ingress bit rate has not changed, then the network node may log the application as not supporting ABR (e.g., non-ABR). When the ingress bitrate decreases, then the network node may log the application as supporting ABR. Further, the network device may use one or more key performance indicators (KPIs) to triage user complaints and proactively communicate with video content providers.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
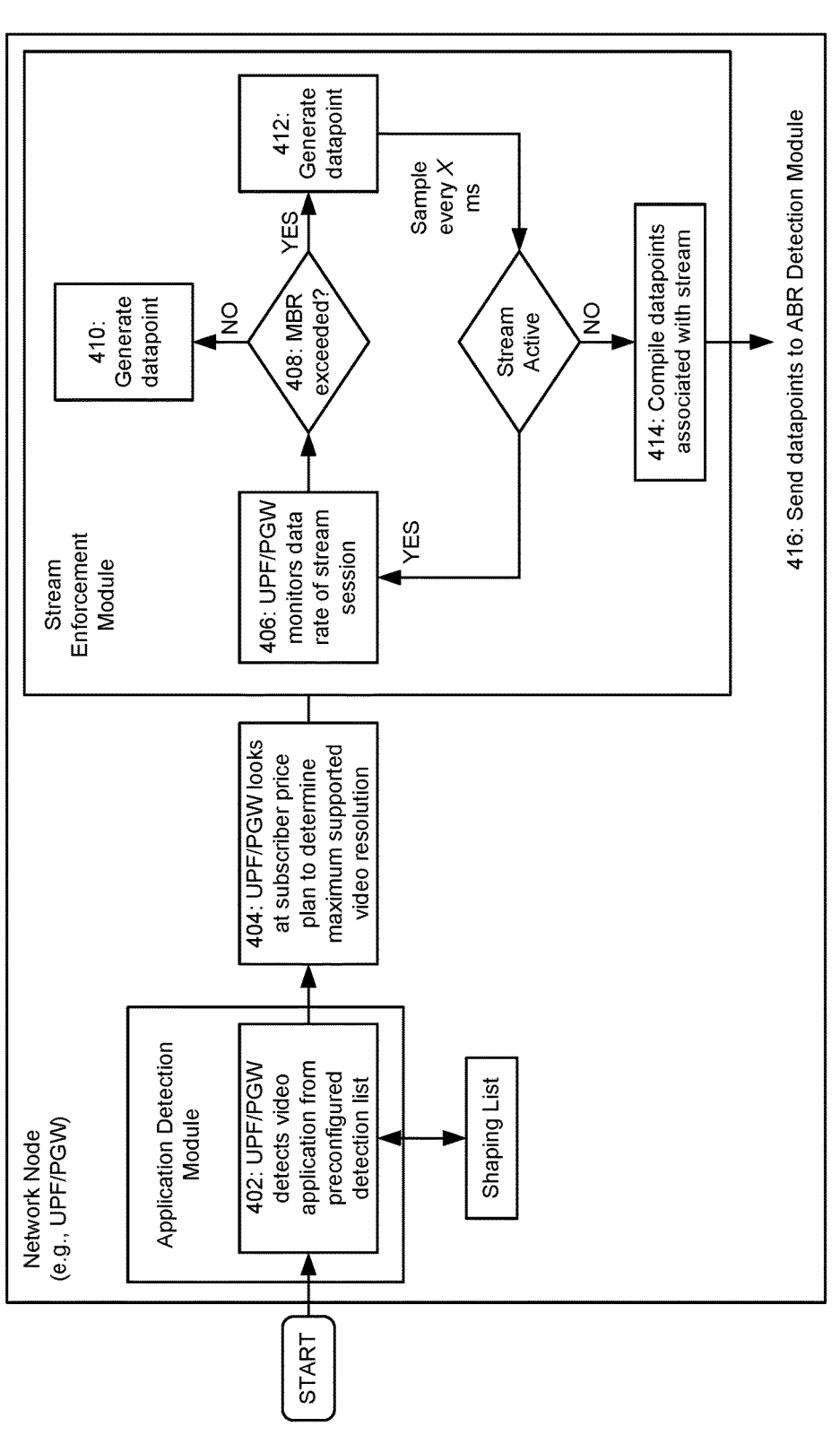
FIG. 4 is a diagram of an example associated with detecting whether an application utilizes adaptive bitrates when providing video traffic.

FIG. 4 is a diagram of an example 400 associated with detecting whether an application utilizes adaptive bitrates when providing video traffic.

As shown by reference number 402, an application detection module in a network node (e.g., a 5G UPF or a 4G PGW) may detect a video application from a preconfigured detection list. The application detection module may maintain a configurable detection list, which may indicate a plurality of different video content providers. Each video content provider may be capable of shaping (or throttling) video traffic, which may be indicated on the list. The application detection module may receive the video traffic from a server associated with a video content provider. As shown by reference number 404, the network node may look at a user price plan to determine a maximum supported video resolution for that user.

As shown by reference number 406, a stream enforcement module of the network node may monitor a bitrate (or data rate) of video traffic (e.g., stream session). As shown by reference number 408, the stream enforcement module may determine whether a maximum bitrate (MBR) is exceeded by the video traffic. In other words, the stream enforcement module may determine whether the monitored bitrate exceeds the MBR, where the MBR may be based on the user price plan. As shown by reference number 410, when the MBR is not exceeded, the stream enforcement module may generate a datapoint. The datapoint may indicate a stream/session identifier, a flow start time, an international mobile subscriber identity (IMSI), an application name, a timestamp, and/or an indication of no traffic shaping. The indication of no traffic shaping may mean that the video traffic is not shaped or throttled by the video content provider. As shown by reference number 412, when the MBR is exceeded, the stream enforcement module may generate a datapoint. The datapoint may indicate a stream/session identifier, a flow start time, an IMSI, an application name, a timestamp, and/or an indication of traffic shaping. The indication of traffic shaping may mean that the video traffic is shaped or throttled by the video content provider. When the video traffic is active (e.g., the stream is active), the stream enforcement module may sample every X milliseconds, where each sample may correspond to a datapoint. As shown by reference number 414, the stream enforcement module may compile datapoints associated with the video traffic, and as shown by reference number 416, the stream enforcement module may send the datapoints to an ABR detection module associated with the network node.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
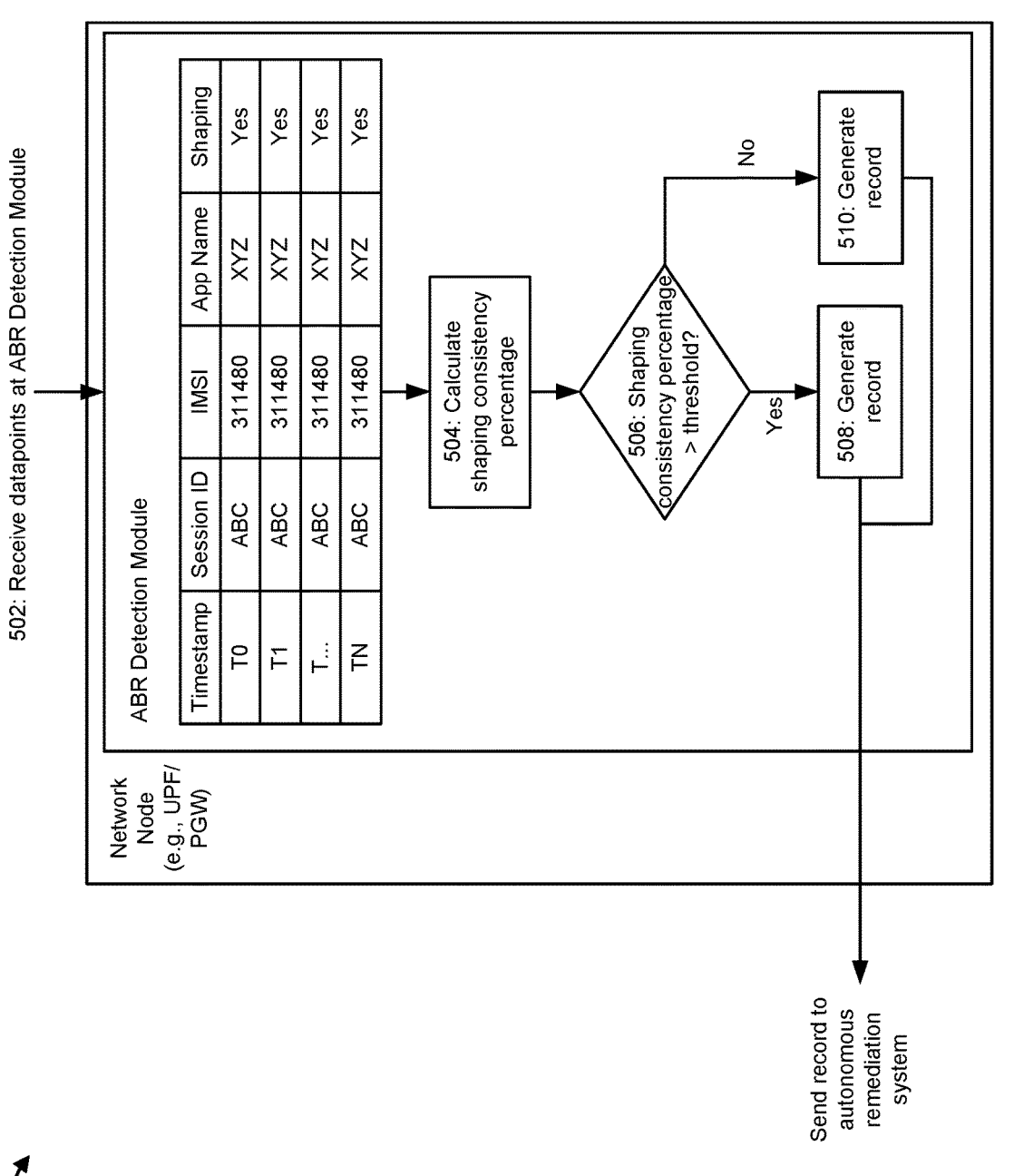
FIG. 5 is a diagram of an example associated with detecting whether an application utilizes adaptive bitrates when providing video traffic.

FIG. 5 is a diagram of an example 500 associated with detecting whether an application utilizes adaptive bitrates when providing video traffic.

As shown by reference number 502, an ABR detection module associated with a network node (e.g., a 5G UPF or a 4G PGW) may receive a plurality of datapoints from a stream enforcement module of the network node (e.g., as shown in FIG. 4). Each datapoint may be associated with a timestamp, a session identifier, an IMSI (e.g., subscriber or user identifier), an application name, and/or an indication of traffic shaping or no traffic shaping. The plurality of datapoints may be associated with video traffic. As shown by reference number 504, the ABR detection module may calculate a traffic shaping consistency percentage, which may be a percentage of time that the video traffic (or stream) was shaped. The traffic shaping consistency percentage may be calculated as a number of datapoints in which traffic shaping is performed, divided by a total number of datapoints.

For example, when the MBR is exceeded in one sample and then the MBR is not exceeded in a following sample (e.g., an ingress bitrate decreases), ABR (or traffic shaping) may be applied by the video content provider. The video content provider may apply ABR based on feedback received from the UE. The feedback may indicate that the bitrate exceeds the MBR. On the other hand, when the MBR is exceeded in one sample and then the MBR continues to be exceeded in following samples, ABR may not be applied by the video content provider. In this case, the video content provider may be unable to receive feedback from the UE, so the video content provider does not adjust the bitrate for the following samples.

As shown by reference number 506, the ABR detection module may determine whether the traffic shaping consistency percentage satisfies a configurable threshold over a period of time. The period of time may be configured per application and/or video content provider. As shown by reference number 508, when the traffic shaping consistency percentage exceeds the configurable threshold, the ABR detection module may generate a record. The record may indicate the session identifier, the application name, and/or an indication of non-ABR. The indication of non-ABR may mean that ABR is not applied to the video traffic. In this case, the ABR detection module may determine that an ingress bitrate has not changed and that ABR is not supported by the application and/or the video content provider, and the ABR detection module may mark the application and/or the video content provider as non-ABR. As shown by reference number 510, when the traffic shaping consistency percentage does not exceed the configurable threshold, the ABR detection module may generate a record. The record may indicate the session identifier, the application name, and/or an indication of ABR. The indication of ABR may mean that ABR is applied to the video traffic. In this case, the ABR detection module may determine that an ingress bitrate decreases and that ABR is supported by the application and/or the video content provider, and the ABR detection module may mark the application and/or the video content provider as ABR. Regardless of whether a record indicates non-ABR or ABR, the record may be sent to an autonomous remediation system.

For example, the ABR detection module may determine that a traffic shaping consistency percentage of 90% satisfies the configurable threshold over a period of 10 seconds. The period of time may vary for different video content providers because different video content providers may use different codecs, etc. The period of time may be 10 seconds for one video content provider, but may be 5 seconds or 15 seconds for another video content provider. A period of time for each video content provider may be stored by the ABR detection module, or alternatively, the ABR detection module may use a machine learning module trained using labeled data to infer the period of time for a certain video content provider. In other words, the ABR detection module may provide the video content provider with sufficient time for ABR to be initiated, which may vary depending on the video content provider. As a result, a threshold for detecting whether or not ABR is used to shape video traffic may vary depending on the video content provider.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

FIG. 6 is a diagram of an example 600 associated with assisting a remediation depending on whether an application utilizes adaptive bitrates.

As shown by reference number 602, an automatic remediation system (or auto remediation operational support system (OSS) subsystem) may receive one or more records from an ABR detection module (e.g., as shown in FIG. 5). The automatic remediation system may be associated with a network operator. Each record may indicate a timestamp, a hostname associated with a specific network node (e.g., PGW/UPF), a session identifier, an application name, whether or not ABR is supported, and/or an IMSI. As shown by reference number 604, the automatic remediation system may determine whether automatic remediation is enabled. When automatic remediation is not enabled, a manual remediation system may be used. As shown by reference number 606, when automatic remediation is enabled, the automatic remediation system may determine whether a non-ABR application or video content provider is detected.

As shown by reference number 608, when the non-ABR application or video content provider is detected, the automatic remediation system may obtain a list of effected network nodes (e.g., PGW/UPFs effected). As shown by reference number 610, the automatic remediation system may determine whether a number of deployed network nodes (e.g., deployed PGW/UPFs) is greater than one. When the number of deployed network nodes is not greater than one, no action may be taken due to a non-production gateway. As shown by reference number 612, when the number of deployed network nodes is greater than one, the automatic remediation system may calculate a percentage of video traffic (or streams) impacted (e.g., per PGW/UPF and application). In some cases, only a subset of streams tied to an application may be non-ABR. The automatic remediation system may calculate the percentage as a number of streams where ABR is not supported (e.g., a number of streams associated with non-ABR), divided by a total number of streams.

As shown by reference number 614, the automatic remediation system may determine whether the percentage of video traffic satisfies a configurable threshold. When the percentage of video traffic does not satisfy the configurable threshold, no action may be taken. As shown by reference number 616, when the percentage of video traffic does satisfy the configurable threshold, the automatic remediation system may make an application programming interface (API) call to the network node to remove a specific application or video content provider from a preconfigured detection list. The preconfigured detection list may be a traffic shaping list that indicates applications and/or video content providers that support traffic shaping. The automatic remediation system may make the API call to a specific PGW/UPF to remove the application and/or video content provider from traffic shaping. As a result, in conjunction with the detection of non-ABR traffic, automatic remediation of user complaints may be achieved by removing applications and/or video content providers from the traffic shaping list on affected gateways. When ABR is turned off for a specific application and automatic remediation is turned on, an impact of non-ABR may be reduced.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
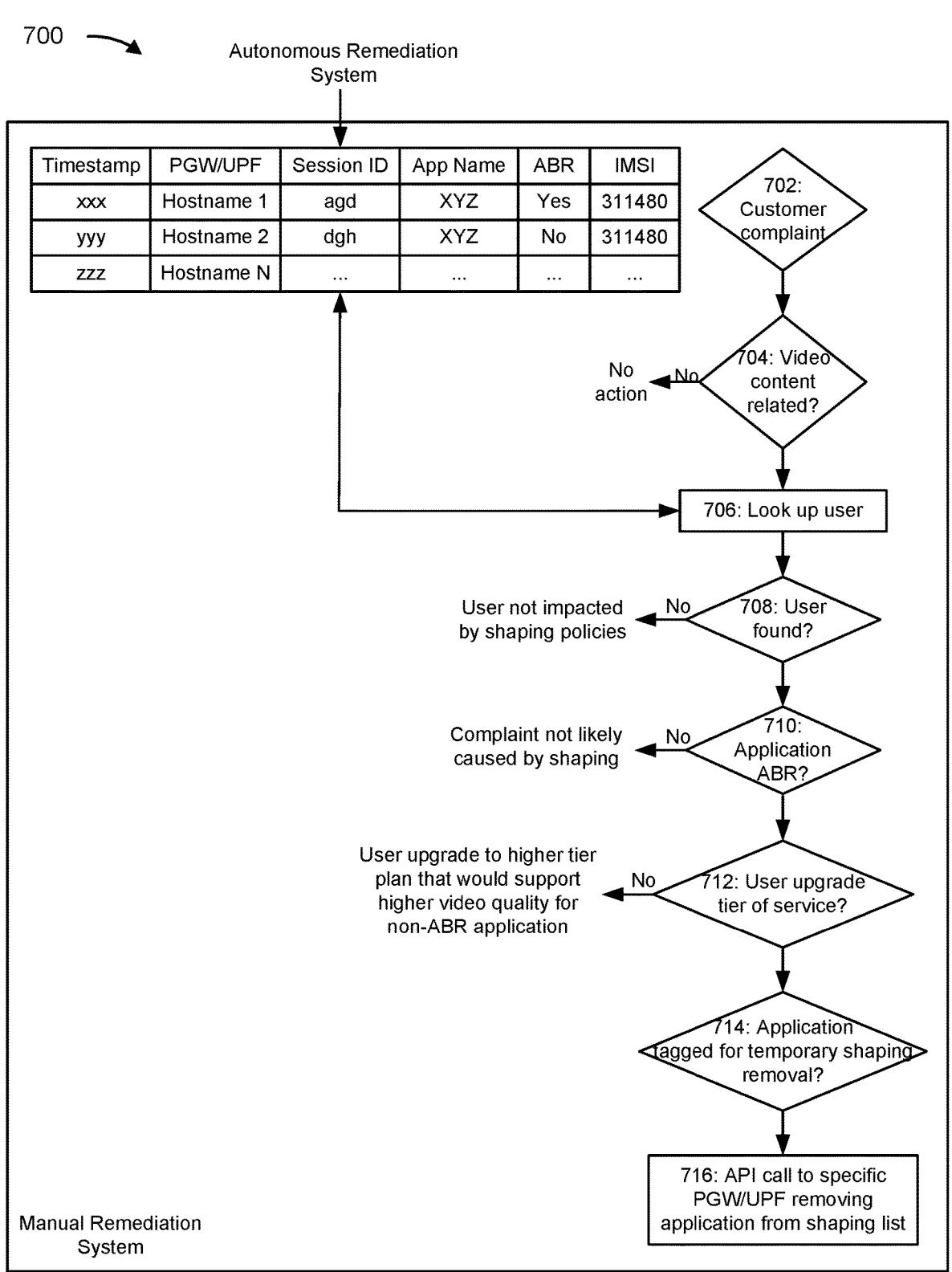
FIG. 7 is a diagram of an example associated with assisting a remediation depending on whether an application utilizes adaptive bitrates.

FIG. 7 is a diagram of an example 700 associated with assisting a remediation depending on whether an application utilizes adaptive bitrates.

In some implementations, when automatic remediation is not enabled, a manual remediation system (or manual remediation OSS subsystem) may be used. The manual remediation system may be associated with a network operator. As shown by reference number 702, the manual remediation system may receive a user complaint. As shown by reference number 704, the manual remediation system may determine whether the user complaint is associated with video content. As shown by reference number 706, when the user complaint is associated with video content, the manual remediation system may look up the user in a plurality of records. The plurality of records may have been generated by an ABR detection module (e.g., as shown in FIG. 5).

As shown by reference number 708, the manual remediation system may determine whether the user is found. When the user is not found, the user may not be impacted by traffic shaping policies. As shown by reference number 710, when the user is found, the manual remediation system may determine whether an application or video content provider associated with the user complaint is associated with ABR. When the application or the video content provider is associated with ABR, the user complaint may not likely be caused by traffic shaping. As shown by reference number 712, when the application or the video content provider is not associated with ABR, the manual remediation system may determine whether the user should upgrade to a higher tier of service. The user may upgrade to a higher tier plan that would support higher video quality for a non-ABR application. As shown by reference number 714, when the user does not upgrade the tier of service, the manual remediation system may determine whether the application or video content provider should be tagged for temporary traffic shaping removal. For example, at the discretion of a user service representative, a high value account may warrant temporary removal of an application from a traffic shaping list. When the application or video content provider is not tagged for temporary traffic shaping removal, the issue may be troubleshooted and explained to the user. As shown by reference number 716, when the application or video content provider is tagged for temporary traffic shaping removal, the manual remediation system may make an API call to the network node to remove a specific application or video content provider from the traffic shaping list. As a result, user complaints related to non-ABR video content may be handled appropriately to improve a user experience.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

Figure 8:
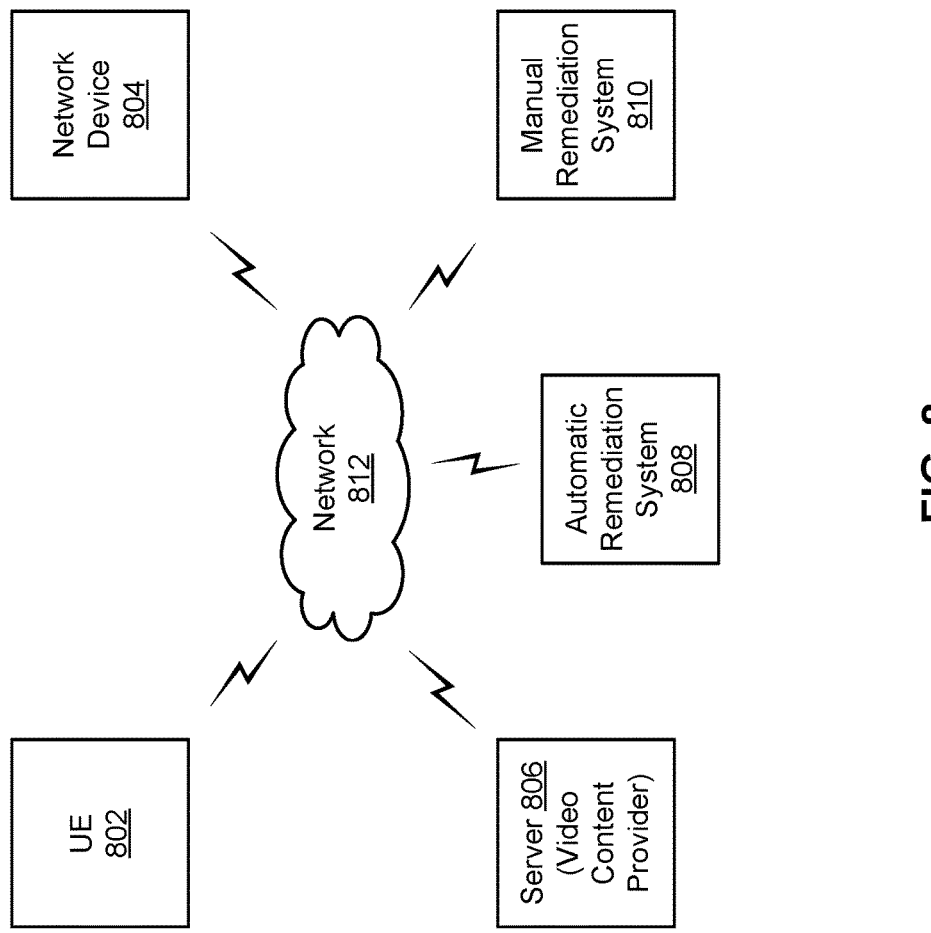
FIG. 8 is a diagram of an example environment in which systems and/or methods described herein may be implemented.

FIG. 8 is a diagram of an example environment 800 in which systems and/or methods described herein may be implemented. As shown in FIG. 8, environment 800 may include a UE 802, a network node 804, a server 806 (e.g., a video content provider), an automatic remediation system 808, a manual remediation system 810, and a network 812. Devices of environment 800 may interconnect via wired connections, wireless connections, or a combination of wired and wireless connections.

The UE 802 may include one or more devices capable of receiving, generating, storing, processing, and/or providing information associated with detecting whether an application utilizes adaptive bitrates when providing video traffic, as described elsewhere herein. The UE 802 may include a communication device and/or a computing device. For example, the UE 802 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a smart television, an IoT device, or a similar type of device.

The network node 804 may include one or more devices capable of receiving, processing, storing, routing, and/or providing information associated with detecting whether an application utilizes adaptive bitrates when providing video traffic, as described elsewhere herein. The network node 804 may be configured to communicate with the UE 802. The network node 804 may be a 4G PGW or a 5G UPF. The network node 804 may be an aggregated network node, meaning that the aggregated network node is configured to utilize a radio protocol stack that is physically or logically integrated within a single RAN node (e.g., within a single device or unit). The network node 804 may be a disaggregated network node (sometimes referred to as a disaggregated base station), meaning that the network node 804 is configured to utilize a protocol stack that is physically or logically distributed among two or more nodes (such as one or more central units (CUs), one or more distributed units (DUs), or one or more radio units (RUs)). The network node 804 may include, for example, a New Radio (NR) base station, a long-term evolution (LTE) base station, a Node B, an eNB (e.g., in 4G), a gNB (e.g., in 4G), an access point, a transmission reception point (TRP), a DU, an RU, a CU, a mobility element of a network, a core network node, a network element, a network equipment, and/or a radio access network (RAN) node.

The server 806 (e.g., the video content provider) may include one or more devices capable of receiving, generating, storing, processing, providing, and/or routing information associated with detecting whether an application utilizes adaptive bitrates when providing video traffic, as described elsewhere herein. The server 806 may include a communication device and/or a computing device. For example, the server 806 may include a server, such as an application server, a client server, a web server, a database server, a host server, a proxy server, a virtual server (e.g., executing on computing hardware), or a server in a cloud computing system. In some implementations, the server 806 may include computing hardware used in a cloud computing environment.

The automatic remediation system 808 may include one or more devices capable of receiving, generating, storing, processing, providing, and/or routing information associated with detecting whether an application utilizes adaptive bitrates when providing video traffic, as described elsewhere herein. The automatic remediation system 808 may include a communication device and/or a computing device. For example, the automatic remediation system 808 may include a server, such as an application server, a client server, a web server, a database server, a host server, a proxy server, a virtual server (e.g., executing on computing hardware), or a server in a cloud computing system. In some implementations, the automatic remediation system 808 may include computing hardware used in a cloud computing environment.

The manual remediation system 810 may include one or more devices capable of receiving, generating, storing, processing, providing, and/or routing information associated with detecting whether an application utilizes adaptive bitrates when providing video traffic, as described elsewhere herein. The manual remediation system 810 may include a communication device and/or a computing device. For example, the manual remediation system 810 may include a server, such as an application server, a client server, a web server, a database server, a host server, a proxy server, a virtual server (e.g., executing on computing hardware), or a server in a cloud computing system. In some implementations, the manual remediation system 810 may include computing hardware used in a cloud computing environment.

The network 812 may include one or more wired and/or wireless networks. For example, the network 812 may include a cellular network (e.g., a 5G network, a 4G network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 812 enables communication among the devices of environment 400.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
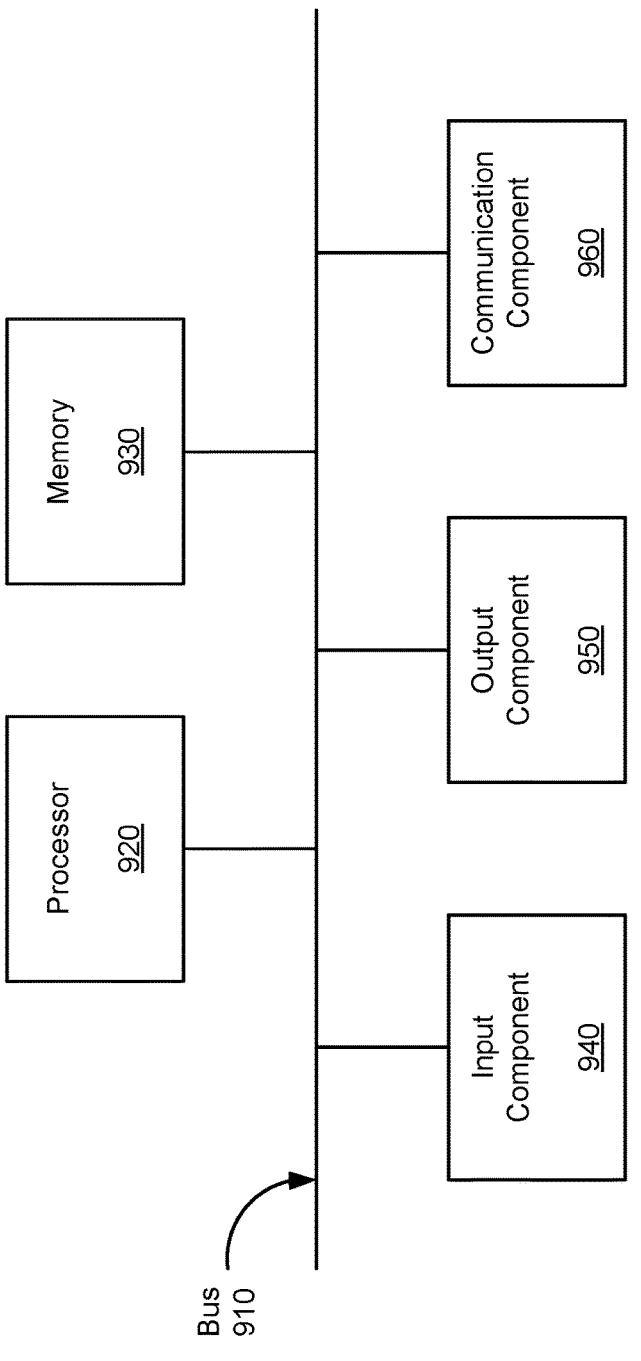
FIG. 9 is a diagram of example components of one or more devices of FIG. 8.

FIG. 9 is a diagram of example components of a device 900 associated with detecting whether an application utilizes adaptive bitrates when providing video traffic. The device 900 may correspond to a network node (e.g., network node 804, which may include a 4G PGW or a 5G UPF). In some implementations, the network node may include one or more devices 900 and/or one or more components of the device 900. As shown in FIG. 9, the device 900 may include a bus 910, a processor 920, a memory 930, an input component 940, an output component 950, and/or a communication component 960.

The bus 910 may include one or more components that enable wired and/or wireless communication among the components of the device 900. The bus 910 may couple together two or more components of FIG. 9, such as via operative coupling, communicative coupling, electronic coupling, and/or electric coupling. For example, the bus 910 may include an electrical connection (e.g., a wire, a trace, and/or a lead) and/or a wireless bus. The processor 920 may include a central processing unit, a graphics processing unit, a microprocessor, a controller, a microcontroller, a digital signal processor, a field-programmable gate array, an application-specific integrated circuit, and/or another type of processing component. The processor 920 may be implemented in hardware, firmware, or a combination of hardware and software. In some implementations, the processor 920 may include one or more processors capable of being programmed to perform one or more operations or processes described elsewhere herein.

The memory 930 may include volatile and/or nonvolatile memory. For example, the memory 930 may include random access memory (RAM), read only memory (ROM), a hard disk drive, and/or another type of memory (e.g., a flash memory, a magnetic memory, and/or an optical memory). The memory 930 may include internal memory (e.g., RAM, ROM, or a hard disk drive) and/or removable memory (e.g., removable via a universal serial bus connection). The memory 930 may be a non-transitory computer-readable medium. The memory 930 may store information, one or more instructions, and/or software (e.g., one or more software applications) related to the operation of the device 900. In some implementations, the memory 930 may include one or more memories that are coupled (e.g., communicatively coupled) to one or more processors (e.g., processor 920), such as via the bus 910. Communicative coupling between a processor 920 and a memory 930 may enable the processor 920 to read and/or process information stored in the memory 930 and/or to store information in the memory 930.

The input component 940 may enable the device 900 to receive input, such as user input and/or sensed input. For example, the input component 940 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 950 may enable the device 900 to provide output, such as via a display, a speaker, and/or a light-emitting diode. The communication component 960 may enable the device 900 to communicate with other devices via a wired connection and/or a wireless connection. For example, the communication component 960 may include a receiver, a transmitter, a transceiver, a modem, a network interface card, and/or an antenna.

The device 900 may perform one or more operations or processes described herein. For example, a non-transitory computer-readable medium (e.g., memory 930) may store a set of instructions (e.g., one or more instructions or code) for execution by the processor 920. The processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry may be used instead of or in combination with the instructions to perform one or more operations or processes described herein. Additionally, or alternatively, the processor 920 may be configured to perform one or more operations or processes described herein. Thus, implementations described herein are not limited to any specific combination of hardware circuitry and software.

The number and arrangement of components shown in FIG. 9 are provided as an example. The device 900 may include additional components, fewer components, different components, or differently arranged components than those shown in FIG. 9. Additionally, or alternatively, a set of components (e.g., one or more components) of the device 900 may perform one or more functions described as being performed by another set of components of the device 900.

FIG. 10 is a flowchart of an example process 1000 associated with detecting whether an application utilizes adaptive bitrates when providing video traffic. In some implementations, one or more process blocks of FIG. 10 may be performed by a network node (e.g., network node 804). In some implementations, one or more process blocks of FIG. 10 may be performed by another device or a group of devices separate from or including the network node (e.g., UE 802, server 806, automatic remediation system 808, and/or manual remediation system 810). Additionally, or alternatively, one or more process blocks of FIG. 10 may be performed by one or more components of device 900, such as processor 920, memory 930, input component 940, output component 950, and/or communication component 960.

As shown in FIG. 10, process 1000 may include receiving, by the network device and from a server, video traffic associated with an application (block 1010). The application may be associated with a video content provider.

As shown in FIG. 10, process 1000 may include detecting, by the network device, whether the application utilizes an adaptive bitrate to provide the video traffic, based on a bitrate associated with the video traffic in relation to a maximum bitrate over a period of time (block 1020).

In some implementations, when detecting whether the application utilizes the adaptive bitrate, the network node may monitor the bitrate associated with the video traffic. The network node may determine whether the bitrate exceeds the maximum bitrate, wherein the maximum bitrate is based on a tiered plan associated with a user. The network node may generate a datapoint based on the maximum bitrate being exceeded or based on the maximum bitrate not being exceeded. The datapoint may indicate whether or not traffic shaping is applied to the video traffic. The datapoint may indicate a stream identifier, a session identifier, a flow start time, a user identifier, an application name, a timestamp, traffic shaping, and/or no traffic shaping. A plurality of datapoints may be generated for active video traffic. The network node may calculate whether a percentage of datapoints associated with traffic shaping satisfies a threshold over the period of time, where the percentage may correspond to an amount of time that the video traffic was traffic shaped. The period of time may be specific to the application. The period of time may be preconfigured or the period of time may be determined using a machine learning model trained with labeled data. The network node may generate a record based on the calculation, wherein the record indicates whether the application utilizes the adaptive bitrate.

In some implementations, when detecting whether the application utilizes the adaptive bitrate, the network node may monitor an ingress bitrate associated with the video traffic. The network node may mark the application as not supporting the adaptive bitrate based on no change to the ingress bitrate over the period of time. The network node may mark the application as supporting the adaptive bitrate based on a decrease in the ingress bitrate over the period of time.

As shown in FIG. 10, process 1000 may include assisting, by the network device, a remediation based on whether the application utilizes the adaptive bitrate (block 1030). For example, the network node may remove the application from a preconfigured detection list for a limited duration of time. Applications that are no longer associated with traffic shaping may be removed from the preconfigured detection list.

As shown in FIG. 10, process 1000 may include removing, by the network device, the application from a preconfigured detection list for a limited duration of time, wherein applications that are no longer associated with traffic shaping are removed from the preconfigured detection list (block 1040). As shown in FIG. 10, process 1000 may include transmitting, by the network device, a notification of a higher tiered plan when an excessive number of video streams are being throttled due to a lower tiered plan (block 1050). As shown in FIG. 10, process 1000 may include transmitting, by the network device, a notification when a certain percentage of video content associated with the video content provider does not utilize the adaptive bitrate (block 1060). As shown in FIG. 10, process 1000 may include transmitting, by the network node, a notification that poor video playback is due to the lower tiered plan and a proposal to upgrade to the higher tiered plan (block 1070).

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device and from a server, video traffic associated with an application, wherein the application is associated with a video content provider;

detecting, by the network device, whether the application utilizes an adaptive bitrate to provide the video traffic, based on a bitrate associated with the video traffic in relation to a maximum bitrate, wherein detecting whether the application utilizes the adaptive bitrate further comprises:

generating a datapoint based on whether the bitrate associated with the video traffic exceeds the maximum bitrate, wherein the datapoint indicates whether traffic shaping is applied to the video traffic, and a plurality of datapoints, including the datapoint, are generated for the video traffic that is associated with traffic shaping, and calculating whether a percentage of the plurality of datapoints satisfies a threshold over a period of time to determine whether the application utilizes the adaptive bitrate; and assisting, by the network device, a remediation based on whether the application utilizes the adaptive bitrate.

2. The method of claim 1, further comprising:

detecting, by the network device, the application from a preconfigured detection list, wherein applications or video content providers indicated on the preconfigured detection list are associated with traffic shaping; and wherein assisting the remediation further comprises:

removing, by the network device, the application from the preconfigured detection list for a limited duration of time, wherein applications that are no longer associated with traffic shaping are removed from the preconfigured detection list.

3. The method of claim 1, wherein assisting the remediation further comprises:

transmitting, by the network device, a notification of a higher tiered plan when an excessive number of video streams are being throttled due to a lower tiered plan, transmitting, by the network device, a notification when a certain percentage of video content associated with the video content provider does not utilize the adaptive bitrate, or transmitting, by the network device, a notification that poor video playback is due to the lower tiered plan and a proposal to upgrade to the higher tiered plan.

4. The method of claim 1, wherein detecting whether the application utilizes the adaptive bitrate further comprises:

monitoring the bitrate associated with the video traffic;

determining whether the bitrate exceeds the maximum bitrate, wherein the maximum bitrate is based on a tiered plan associated with a user; and generating a record based on the calculation, wherein the record indicates whether the application utilizes the adaptive bitrate.

5. The method of claim 1, wherein the datapoint indicates one or more of: a stream identifier, a session identifier, a flow start time, a user identifier, an application name, a timestamp, traffic shaping, or no traffic shaping.

6. The method of claim 1, wherein the period of time is specific to the application, and the period of time is preconfigured or the period of time is determined using a machine learning model trained with labeled data.

7. The method of claim 1, wherein detecting whether the application utilizes the adaptive bitrate further comprises:

monitoring an ingress bitrate associated with the video traffic;

marking the application as not supporting the adaptive bitrate based on no change to the ingress bitrate over a period of time; or marking the application as supporting the adaptive bitrate based on a decrease in the ingress bitrate over the period of time.

8. The method of claim 1, wherein the network device is a packet gateway or a user plane function (UPF) in a wireless network.

9. A network device, comprising:

one or more processors configured to:

receive, from a server, video traffic associated with an application, wherein the application is associated with a video content provider;

detect whether the application utilizes an adaptive bitrate to provide the video traffic, based on a bitrate associated with the video traffic in relation to a maximum bitrate, wherein the one or more processors, when detecting whether the application utilizes the adaptive bitrate, are to:

generate a datapoint based on whether the bitrate associated with the video traffic exceeds the maximum bitrate, wherein the datapoint indicates whether traffic shaping is applied to the video traffic, and a plurality of datapoints, including the datapoint, are generated for the video traffic that is associated with traffic shaping, and calculate whether a percentage of the plurality of datapoints satisfies a threshold over a period of time to determine whether the application utilizes the adaptive bitrate; and assist a remediation based on whether the application utilizes the adaptive bitrate.

10. The network device of claim 9, wherein the one or more processors are further configured to:

detect the application from a preconfigured detection list, wherein applications or video content providers indicated on the preconfigured detection list are associated with traffic shaping; and remove the application from the preconfigured detection list for a limited duration of time, wherein applications that are no longer associated with traffic shaping are removed from the preconfigured detection list.

11. The network device of claim 9, wherein the one or more processors, to assist the remediation, are further configured to:

transmit a notification of a higher tiered plan when an excessive number of video streams are being throttled due to a lower tiered plan, transmit a notification when a certain percentage of video content associated with the video content provider does not utilize the adaptive bitrate, or transmit a notification that poor video playback is due to the lower tiered plan and a proposal to upgrade to the higher tiered plan.

12. The network device of claim 9, wherein the one or more processors, to detect whether the application utilizes the adaptive bitrate, are further configured to:

monitor the bitrate associated with the video traffic;

determine whether the bitrate exceeds the maximum bitrate, wherein the maximum bitrate is based on a tiered plan associated with a user; and generate a record based on the calculation, wherein the record indicates whether the application utilizes the adaptive bitrate.

13. The network device of claim 9, wherein the datapoint indicates one or more of: a stream identifier, a session identifier, a flow start time, a user identifier, an application name, a timestamp, traffic shaping, or no traffic shaping.

14. The network device of claim 9, wherein the period of time is specific to the application, and the period of time is preconfigured or the period of time is determined using a machine learning model trained with labeled data.

15. The network device of claim 9, wherein the one or more processors, to detect whether the application utilizes the adaptive bitrate, are further configured to:

monitor an ingress bitrate associated with the video traffic;

mark the application as not supporting the adaptive bitrate based on no change to the ingress bitrate over a period of time; or mark the application as supporting the adaptive bitrate based on a decrease in the ingress bitrate over the period of time.

16. The network device of claim 9, wherein the network device is a packet gateway or a user plane function (UPF) in a wireless network.

17. A non-transitory computer-readable medium storing a set of instructions, the set of instructions comprising:

one or more instructions that, when executed by one or more processors of a network device, cause the network device to:

receive, from a server, video traffic associated with an application, wherein the application is associated with a video content provider;

detect whether the application utilizes an adaptive bitrate to provide the video traffic, based on a bitrate associated with the video traffic in relation to a maximum bitrate, wherein the one or more instructions, cause the network device to detect whether the application utilizes the adaptive bitrate, cause the network device to:

generate a datapoint based on whether the bitrate associated with the video traffic exceeds the maximum bitrate, wherein the datapoint indicates whether traffic shaping is applied to the video traffic, and a plurality of datapoints, including the datapoint, are generated for the video traffic that is associated with traffic shaping, and calculate whether a percentage of the plurality of datapoints satisfies a threshold over a period of time to determine whether the application utilizes the adaptive bitrate; and assist a remediation based on whether the application utilizes the adaptive bitrate.

18. The non-transitory computer-readable medium of claim 17, wherein the one or more instructions, when executed by the one or more processors, further cause the network device to:

monitor the bitrate associated with the video traffic;

determine whether the bitrate exceeds the maximum bitrate, wherein the maximum bitrate is based on a tiered plan associated with a user; and generate a record based on the calculation, wherein the record indicates whether the application utilizes the adaptive bitrate.

19. The non-transitory computer-readable medium of claim 17, wherein the one or more instructions, when executed by the one or more processors, further cause the network device to:

monitor an ingress bitrate associated with the video traffic;

mark the application as not supporting the adaptive bitrate based on no change to the ingress bitrate over a period of time; or mark the application as supporting the adaptive bitrate based on a decrease in the ingress bitrate over the period of time.

20. The non-transitory computer-readable medium of claim 17, wherein the one or more instructions, when executed by the one or more processors, further cause the network device to:

detect the application from a preconfigured detection list, wherein applications or video content providers indicated on the preconfigured detection list are associated with traffic shaping, and wherein the one or more instructions, cause the network device to assist the remediation, cause the network device to:

remove the application from the preconfigured detection list for a limited duration of time, wherein applications that are no longer associated with traffic shaping are removed from the preconfigured detection list.

* * * * *